US011912184B2

(12) United States Patent
Reader

(10) Patent No.: US 11,912,184 B2
(45) Date of Patent: Feb. 27, 2024

(54) CABLE SLEEVE FOR A FOLDABLE HEADREST

(71) Applicant: GM Global Technology Operations LLC, Detroit, MI (US)

(72) Inventor: Edeena Alicia Reader, Canton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 47 days.

(21) Appl. No.: 17/702,142

(22) Filed: Mar. 23, 2022

(65) Prior Publication Data

US 2023/0302980 A1 Sep. 28, 2023

(51) Int. Cl.
*B60N 2/859* (2018.01)
*B60N 2/856* (2018.01)
*B60N 2/844* (2018.01)
*B60N 2/80* (2018.01)

(52) U.S. Cl.
CPC ............ *B60N 2/859* (2018.02); *B60N 2/844* (2018.02); *B60N 2/856* (2018.02); *B60N 2002/899* (2018.02)

(58) Field of Classification Search
CPC ... B60N 2/856; B60N 2/859; B60N 2002/899
See application file for complete search history.

(56) References Cited

U.S. PATENT DOCUMENTS

| 7,118,171 | B2 * | 10/2006 | Fowler | B60N 2/3009 297/61 |
| 8,459,744 | B2 | 6/2013 | Sayama | |
| 11,124,100 | B1 * | 9/2021 | Kangane | B60N 2/015 |
| 2001/0002764 | A1 * | 6/2001 | Fischer | B60N 2/829 297/410 |

(Continued)

FOREIGN PATENT DOCUMENTS

WO  WO-2018202970 A1 * 11/2018 ............. B60N 2/366

OTHER PUBLICATIONS

Carrier S, machine English Translation, Nov. 2018, WO-2018202970-A1, espacenet.com (Year: 2018).*

(Continued)

*Primary Examiner* — David R Dunn
*Assistant Examiner* — Tania Abraham
(74) *Attorney, Agent, or Firm* — CANTOR COLBURN LLP

(57) ABSTRACT

A vehicle seat including a seatback, and headrest including a shell member. A release mechanism is mounted to the shell member. The release mechanism selectively locks the headrest relative to the seatback. An actuator system extends between the seatback and the headrest. The actuator system includes a sleeve having a first end fixedly connected relative to the seatback, a second end fixedly connected relative to the headrest shell, and an intermediate portion defining a longitudinal length of the sleeve, and a cable extending through the sleeve. The cable has a first end section arranged in the seatback and a second end section (Continued)

coupled to the release mechanism. The longitudinal length of the sleeve includes a first dimension when the seatback is in an upright position and the longitudinal length has a second, longer dimension, when the seatback is in a folded configuration.

17 Claims, 15 Drawing Sheets

(56) References Cited

U.S. PATENT DOCUMENTS

| | | |
|---|---|---|
| 2010/0078972 A1 | 4/2010 | Sayama |
| 2011/0101738 A1* | 5/2011 | Jensen .................. B60N 2/812 297/410 |
| 2014/0333098 A1 | 11/2014 | Deforest |
| 2015/0232002 A1 | 8/2015 | Little |
| 2015/0266401 A1 | 9/2015 | Grable |
| 2015/0343928 A1 | 12/2015 | Nilsson et al. |
| 2017/0028884 A1 | 2/2017 | Kapusky et al. |
| 2017/0158101 A1 | 6/2017 | Little |
| 2018/0072203 A1 | 3/2018 | Purves |
| 2018/0111521 A1 | 4/2018 | Imayou et al. |
| 2021/0009020 A1* | 1/2021 | Jang ....................... B60N 2/856 |
| 2021/0370816 A1 | 12/2021 | Gummin et al. |
| 2022/0258656 A1 | 8/2022 | Little |
| 2023/0126292 A1 | 4/2023 | Berndtson et al. |

OTHER PUBLICATIONS

German Application No. 10 2022 123 173.9 filed Sep. 12, 2022; German Office Action dated Jul. 28, 2023; 4 pages.

* cited by examiner

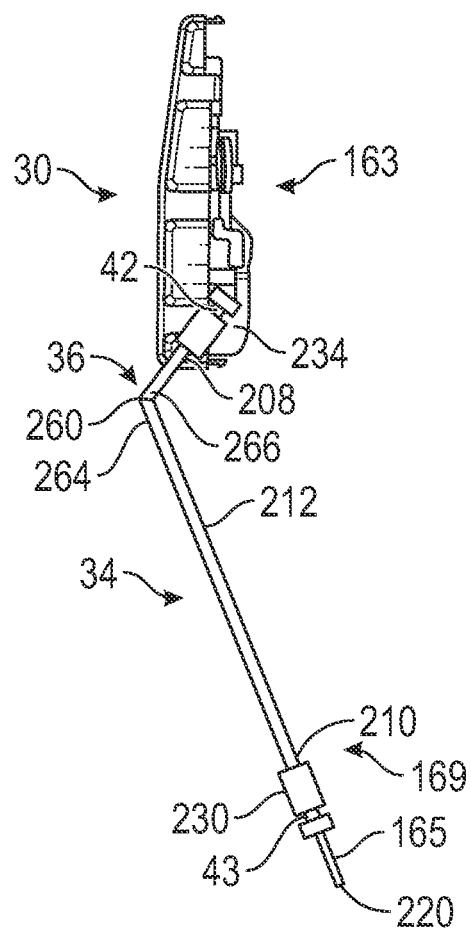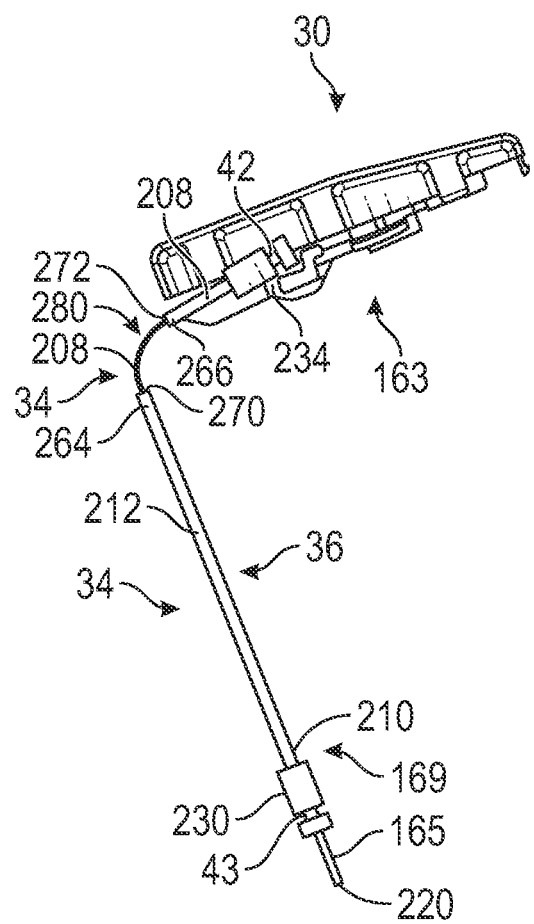
FIG. 29
FIG. 30

CABLE SLEEVE FOR A FOLDABLE HEADREST

INTRODUCTION

The subject disclosure relates to the art of vehicles and, more particularly, to a cable sleeve for a foldable headrest in a vehicle.

Most motor vehicles that include front and rear row seating include headrests on rear seatbacks. The headrests provide support to passenger physiology in response to forces that may be applied to a rear of the vehicle. In some configurations, headrests may be removed. An actuator may be arranged at a headrest support that, when engaged, allows the headrest to be removed from the seatback. Removal of the headrest may provide an enhanced view through a window at a rear of the vehicle.

In certain configurations, rear seatbacks are reconfigurable. That is, rear seatbacks may be folded forward to provide different storage capabilities. In such cases, the rear headrest may be removed in order to allow the seatback to fully fold forward. In other cases, the rear headrest may fold to accommodate a full folding of the rear seatback. Mechanisms for releasing the rear headrest include pull straps that release a pin, push buttons, and levers. In some cases, simply folding the rear seat forward causes the headrest to be released and fold forward.

Automatic systems, such as those that operate with folding of the seat, often include a cable actuator. The cable actuator typically includes a cable that runs through the seatback and up into the head rest. In some cases, the cable is run through a sleeve. The sleeve protects the cable and maintains an unobstructed actuation path. As the seatback folds forward, tension is generated in the cable causing a release member to disengage. In order to ensure proper operation, pinch points, and binding of the cable and the sleeve should be avoided. If either the cable or the sleeve cannot freely move, the actuator member may not release and the headrest may not fold. Accordingly, the industry would welcome a system that reduces binding passing through a foldable seatback into a foldable headrest.

SUMMARY

Disclosed in accordance with a non-limiting example is a vehicle seat including a seatback, a first seatback support mounted to the seatback, and a second seatback support mounted to the seatback. The second seatback support is spaced from the first seatback support. A headrest including a shell member is coupled to the first seatback support and the second seatback support. A release mechanism is mounted to the shell member. The release mechanism selectively locks the headrest relative to the seatback. An actuator system extends between the seatback and the headrest through one of the first and second seatback supports. The actuator system includes a sleeve having a first end fixedly connected relative to the seatback, a second end fixedly connected relative to the headrest shell, and an intermediate portion defining a longitudinal length of the sleeve, and a cable extending through the sleeve. The cable has a first end section arranged in the seatback and a second end section coupled to the release mechanism. The longitudinal length of the sleeve includes a first dimension when the seatback is in an upright position and the longitudinal length has a second, longer dimension, when the seatback is in a folded configuration.

In addition to one or more of the features described herein the sleeve includes a first mounting ferrule secured to the first end and a second mounting ferrule secured to the second end, the second mounting ferrule being fixedly secured to the shell member of the headrest.

In addition to one or more of the features described herein the second end of the sleeve is slidable relative to the cable.

In addition to one or more of the features described herein the sleeve includes a split arranged along the intermediate portion, the split extending radially through the sleeve between the first end and the second end.

In addition to one or more of the features described herein the split includes a first end portion of the sleeve and a second end portion of the sleeve, the first end portion having a first surface and the second end portion having a second surface.

In addition to one or more of the features described herein the second surface is spaced from the first surface forming a discontinuity in the sleeve when the seatback is in a folded configuration.

In addition to one or more of the features described herein the second surface abuts the first surface when the seatback is in the upright configuration.

Also disclosed in accordance with a non-limiting example is a vehicle including a body including a passenger compartment. A seat is arranged in the passenger compartment. The seat includes a seatback, a first seatback support mounted to the seatback, and a second seatback support mounted to the seatback. The second seatback support is spaced from the first seatback support. A headrest including a shell member is coupled to the first seatback support and the second seatback support. A release mechanism is mounted to the shell member. The release mechanism selectively locks the headrest relative to the seatback. An actuator system extends between the seatback and the headrest through one of the first and second seatback supports. The actuator system includes a sleeve having a first end fixedly connected relative to the seatback, a second end fixedly connected relative to the headrest shell, and an intermediate portion defining a longitudinal length of the sleeve, and a cable extending through the sleeve. The cable has a first end section arranged in the seatback and a second end section coupled to the release mechanism. The longitudinal length of the sleeve includes a first dimension when the seatback is in an upright position and the longitudinal length has a second, longer dimension, when the seatback is in a folded configuration.

In addition to one or more of the features described herein the sleeve includes a first mounting ferrule secured to the first end and a second mounting ferrule secured to the second end, the second mounting ferrule being fixedly secured to the shell member of the headrest.

In addition to one or more of the features described herein the second end of the sleeve is slidable relative to the cable.

In addition to one or more of the features described herein the sleeve includes a split arranged along the intermediate portion, the split extending radially through the sleeve between the first end and the second end.

In addition to one or more of the features described herein the split includes a first end portion of the sleeve and a second end portion of the sleeve, the first end portion having a first surface and the second end portion having a second surface.

In addition to one or more of the features described herein the second surface is spaced from the first surface forming a discontinuity in the sleeve when the seatback is in a folded configuration.

In addition to one or more of the features described herein the second surface abuts the first surface when the seatback is in the upright configuration.

Further disclosed in accordance with a non-limiting example is a method of folding a headrest in a vehicle includes folding a seatback forward, creating tension in a cable protected in a sleeve passing through the seatback into the headrest, the sleeve having a first end anchored in the seatback and a second end anchored in the headrest, activating a release mechanism allowing the headrest to pivot with the tension in the cable, rotating the headrest relative to the seatback, and lengthening the sleeve as the headrest rotates to avoid binding.

In addition to one or more of the features described herein lengthening the sleeve includes shifting the second end of the sleeve relative to the first end of the sleeve.

In addition to one or more of the features described herein shifting the second end of the sleeve relative to the first end of the sleeve includes sliding the second end of the sleeve over the cable.

In addition to one or more of the features described herein lengthening the sleeve includes sliding the second end of the sleeve over the cable without moving the first end of the sleeve.

In addition to one or more of the features described herein the sleeve includes a split defined between the first end and the second end, the split including a first surface and a second surface, wherein lengthening the sleeve includes shifting the first surface relative to the second surface.

In addition to one or more of the features described herein lengthening the sleeve includes creating a discontinuity in the sleeve between the first surface and the second surface.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 29 depicts a side view of a headrest in an upright position including an actuator system, in accordance with another non-limiting example;

FIG. 30 depicts the headrest of FIG. 30 in a folded configuration, in accordance with a non-limiting example;

DETAILED DESCRIPTION

Figure 1:
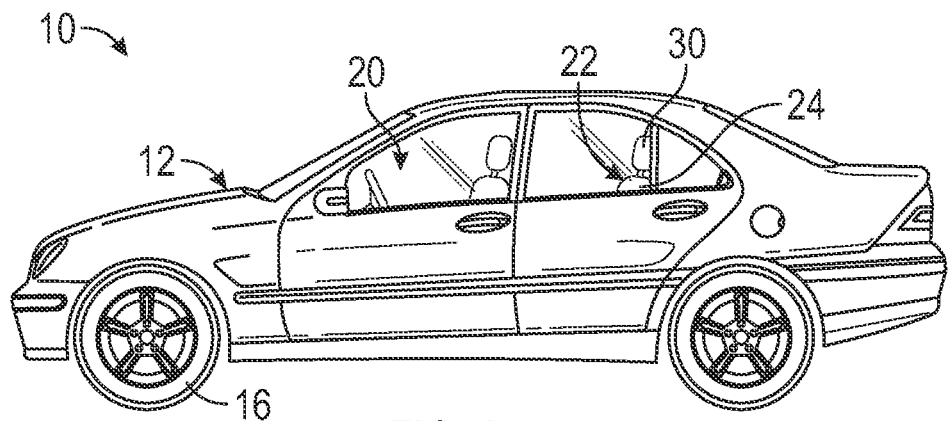
FIG. 1 depicts a vehicle including a multi-actuator capable headrest, in accordance with a non-limiting example.

The following description is merely exemplary in nature and is not intended to limit the present disclosure, its application or uses. It should be understood that throughout the drawings, corresponding reference numerals indicate like or corresponding parts and features.

Figure 2:
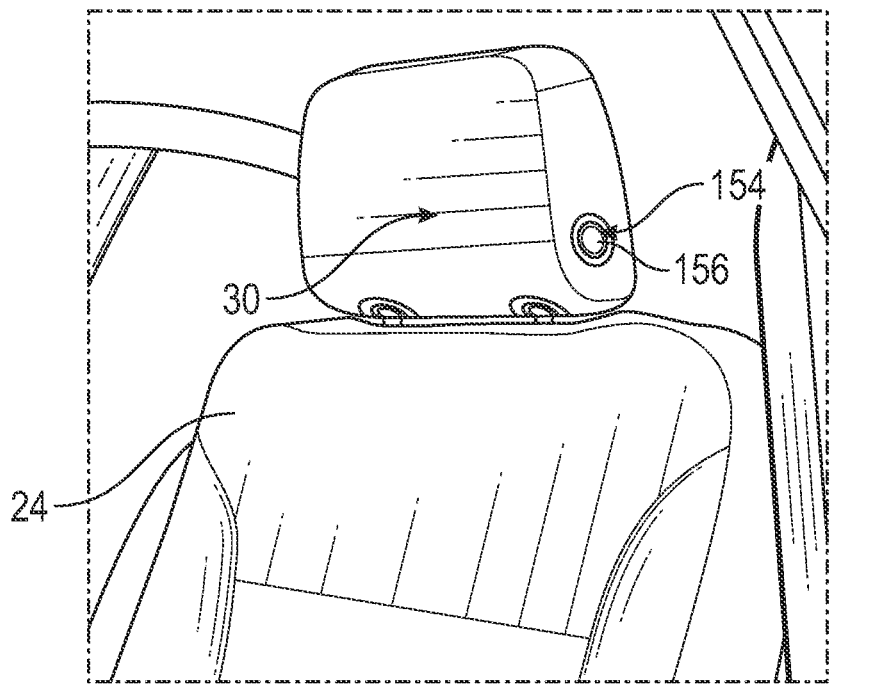
FIG. 2 depicts the multi-actuator capable headrest mounted to a foldable seatback, in accordance with a non-limiting example.

A vehicle, in accordance with a non-limiting example, is indicated generally at 10 in FIG. 1. Vehicle 10 includes a body 12 supported on a frame (not shown) and a plurality of wheels, one of which is indicated at 16. Body 12 includes a passenger compartment 20 that includes at least one seat 22. Referring to FIG. 2, seat 22 includes a foldable seatback 24 that supports a multi-actuator capable headrest 30. Multi-actuator capable headrest 30 may be folded forward, along with foldable seatback 24, upon activation of one or more actuators as will be detailed herein.

Figure 3:
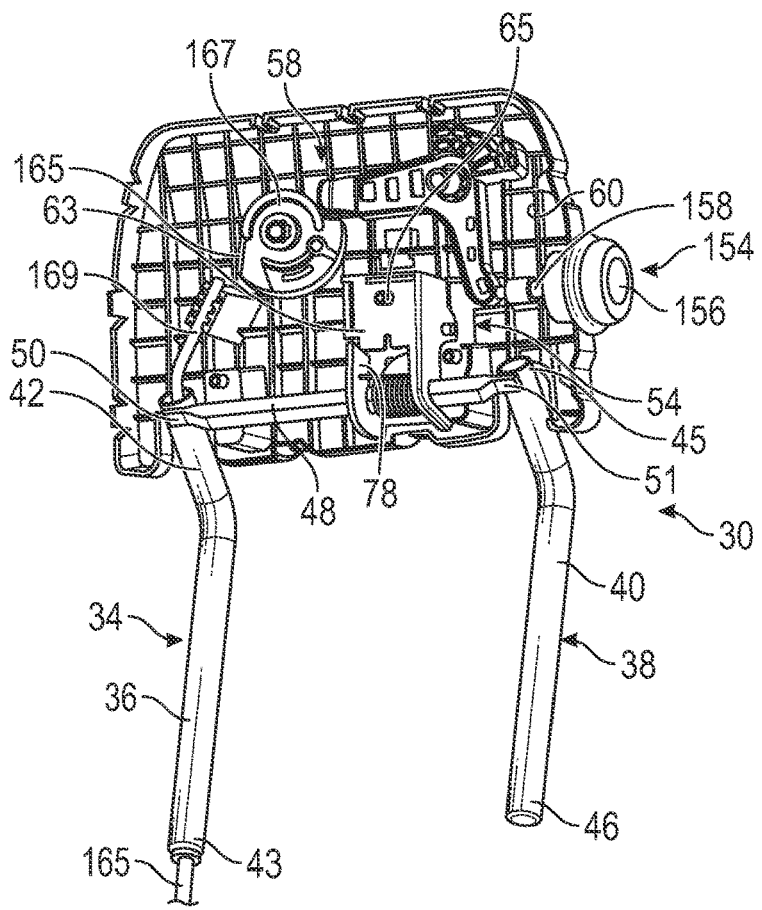
FIG. 3 is a partially disassembled view of the multi-actuator capable headrest of FIG. 2, depicting an actuator and multi-cam release mechanism mounted to a head rest shell portion, in accordance with a non-limiting example.
Figure 4:
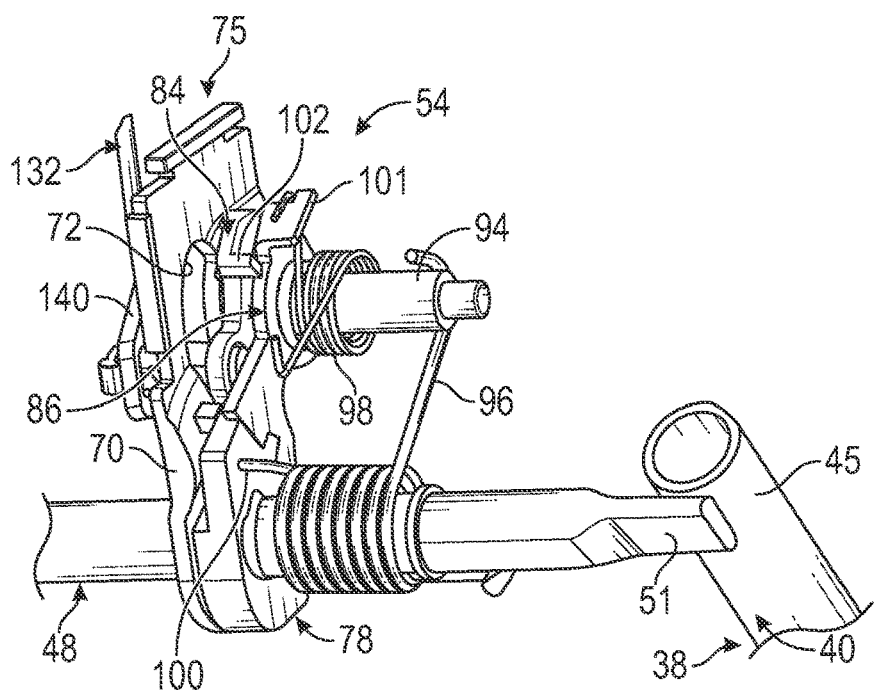
FIG. 4 depicts the multi-cam release mechanism of FIG. 3, in accordance with a non-limiting example.
Figure 6:
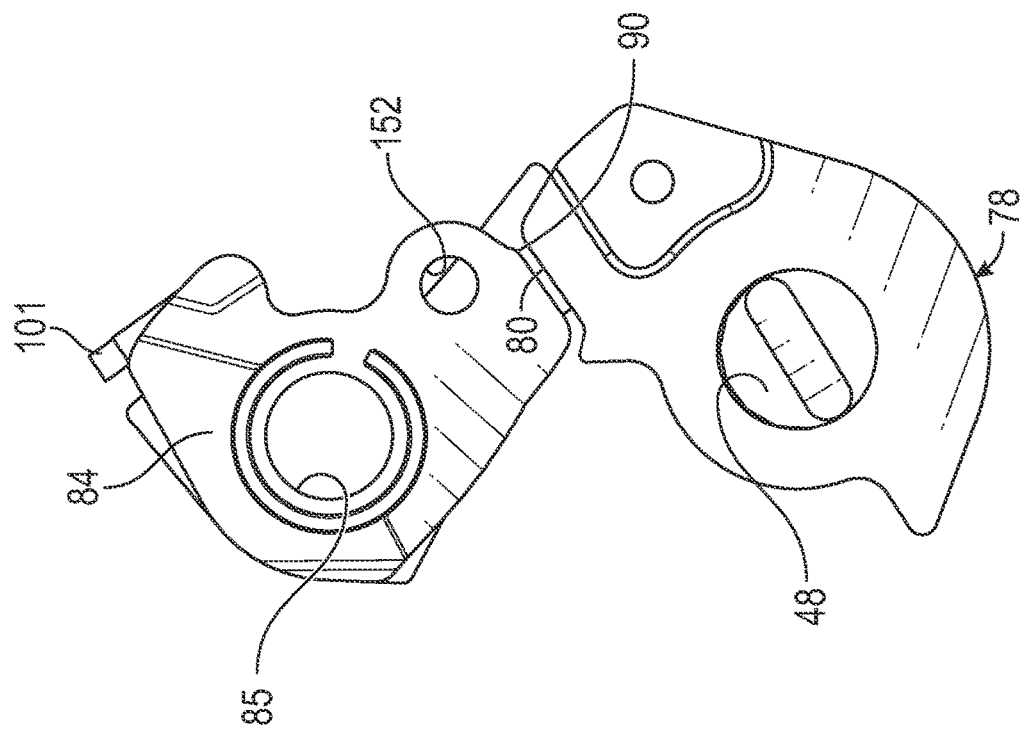
FIG. 6 depicts a side view of a first cam member interacting with a second cam member and a biasing element of the multi-cam release mechanism of FIG. 5, in accordance with a non-limiting example.

Reference will now follow to FIG. 3 with continued reference to FIGS. 1 and 2 in describing multi-actuator capable headrest 30. Multi-actuator capable headrest 30 includes a first seatback support 34 defined by a first hollow tube 36 and a second seatback support 38 defined by a second hollow tube 40. First seatback support 34 includes a first end 42 and a second end 43. Second seatback support 38 includes a first end 45 and a second end 46. Second end 43 of first seatback support 34 and second end 46 of second seatback support 38 extend into foldable seatback 24. A headrest support 48 extends between first end 42 of first seatback support 34 and first end 45 of second seatback support 38. That is, headrest support 48 includes a first end portion 50 connected to first end 42 and a second end portion 51 coupled to first end 45.

In accordance with a non-limiting example, multi-actuator capable headrest support 30 includes a multi-cam release mechanism 54 mounted to headrest support 48 and an actuator mechanism 58 that selectively engages with multi-cam release mechanism 54 to allow multi-actuator capable headrest 30 to rotate forward. Actuator mechanism 58 is mounted to a headrest shell 60. A housing 63 connects multi-cam release mechanism 54 to headrest shell 60 with a single mechanical fastener 65. As will become more fully evident herein, the use of a single mechanical fastener to join multi-cam release mechanism 54 to headrest shell 60 reduces manufacturing steps and speeds up manufacturing time.

Reference will now follow to FIGS. 4-7 with continued reference to FIG. 3. Multi-cam release mechanism 54 includes a connector element 70 that rotates relative to headrest support 48. Connector element 70 includes a guide slot 72 which, as will be detailed herein, establishes a travel path for actuator mechanism 58. A biasing element 78 is rotationally positioned on headrest support 48 adjacent to connector element 70. Biasing element 78 promotes rotation of multi-actuator capable headrest 30 about an axis defined by headrest support 48. Biasing element 78 includes a first cam surface 80 and an opposing second cam surface 82.

Multi-cam release mechanism 54 may take the form of a dual cam system including a first cam member 84 having an opening 85 and a second cam member 86 including an opening 87. First cam member 84 includes a first cam portion 90 that selectively engages with first cam surface 80 and second cam member 86 includes a second cam portion 92 that selectively engages with second cam surface 82. First cam member 84 and second cam member 86 are positioned on a support pin 94 that extends from connector element 70 through openings 85 and 87.

Multi-cam release mechanism 54 includes a first spring member 96 and a second spring member 98. First spring member 96 coils about headrest support 48 and includes a first end (not separately labeled) that connects to a passage 100 formed in biasing element 78 and a second end (also not separately labeled) that engages support pin 94. Second spring member 98 is connected between a projection 101 on second cam member 86 and connector element 70. First cam member 84 includes a projection portion 102 that engages projection 101. That is, when first cam member 84 is rotated such that first cam portion 90 disengages from first cam surface 80 projection portion 102 acts upon projection 101 to selectively rotate second cam member 86 and disengage second cam portion 92 from second cam surface 82 allowing multi-actuator capable headrest to rotate.

First cam surface 80 and first cam portion 90 include a substantially 0° degree angle and second cam surface 82 and second cam portion 92 include a non-zero angle. In this manner, multi-actuator capable headrest 30 is secured in a non-rotated or deployed configuration such as shown in FIG. 2 and may be easily rotated to a non-deployed configuration without a large force input as will be detailed more fully herein.

Reference will now follow to FIGS. 8-11, with continued reference to FIGS. 4-7 in describing actuator mechanism 58 in accordance with a non-limiting example. Actuator mechanism 58 includes an actuator 104 that may take the form of a bell crank 106. Actuator 104 includes a first end 108 defining a first actuator portion 110, a second end 112 defining a second actuator portion 114, and an intermediate portion 116 that defines a mount 118 having an opening 120 that engages with a rotating member (not separately labeled) supported on headrest shell 60. Actuator 104 also includes a dynamic counter balance 122. Dynamic counter balance 122 is sized and positioned so as to prevent actuation of actuator mechanism 58 when multi-actuator capable headrest 30 experiences high acceleration forces.

Figure 10:
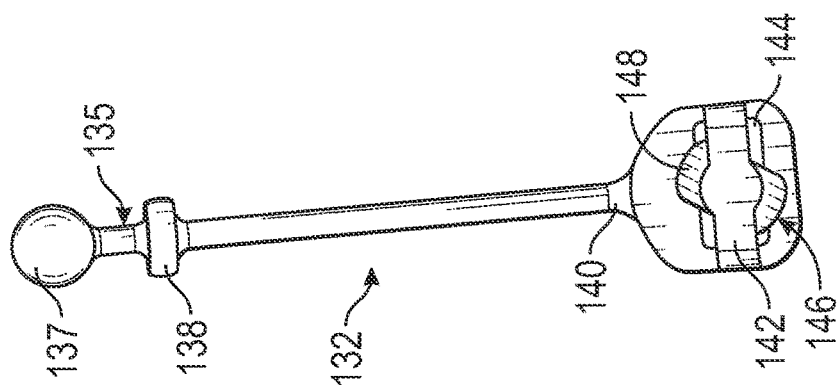
FIG. 10 depicts the connecting rod of FIG. 8 depicting a connector pin supported at a first end of the connecting rod of FIG. 9, in accordance with a non-limiting example.
Figure 9:
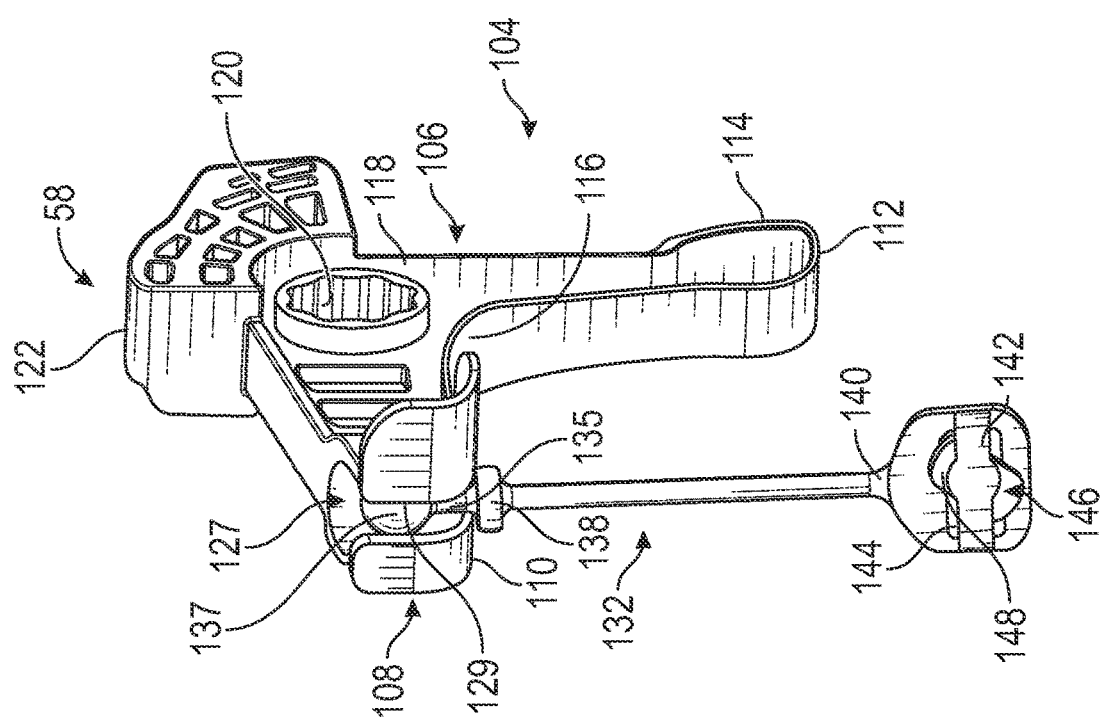
FIG. 9 depicts the connecting rod connected to the actuator of FIG. 8, in accordance with a non-limiting example.
Figure 11:
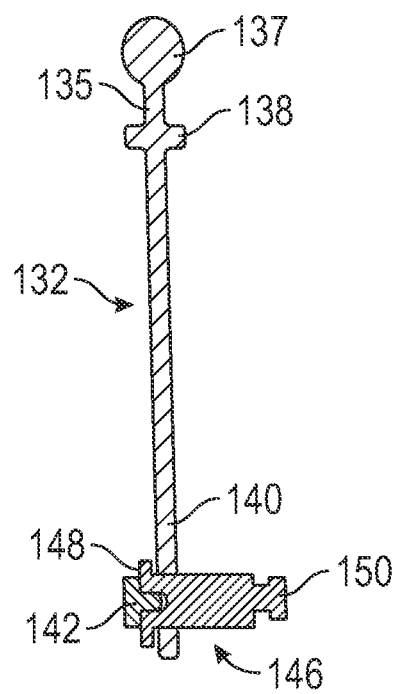
FIG. 11 is a partial cross-sectional side view of the connector pin of FIG. 10, in accordance with a non-limiting example.

In accordance with a non-limiting example, actuator 104 includes a socket 127 and a slot 129 at first end 108. Socket 127 and slot 129 are arranged so as to accommodate a connection to a connecting rod 132. Connecting rod 132 includes a first end 135 including a ball 137 as shown in FIGS. 9 and 10 that may moveably nest within socket 127 forming an articulating joint (FIG. 9) and a projection 138 spaced from ball 137. The incorporation of ball 137 and projection 138 allows connecting rod 132 to act on first end 108 in compression, through projection 138, and in tension, through ball 137. Connecting rod 132 also includes a second end 140 that connects with first cam member 84. (FIG. 8) As shown in FIGS. 10 and 11, a retainer 142 is provided at second end 140. Retainer 142 extends across an opening 144 formed in second end 140 forming a basket. Second end 140 is secured to first cam member 84 via a guide pin 146 having a base 148 and a snap connector 150 that extends into an opening 152 (FIG. 6) formed in first cam member 84. Retainer 142 traps guide pin 146 in opening 144. Base 148 may be accommodated by openings 144. After being inserted, guide pin 146 may be rotated to capture base 148 between second end 140 and retainer 142. Guide pin 146 is passed through guide slot 72 in connector element 70 (FIG. 5) and is coupled to first cam member 84 via snap connector 150.

Figure 12:
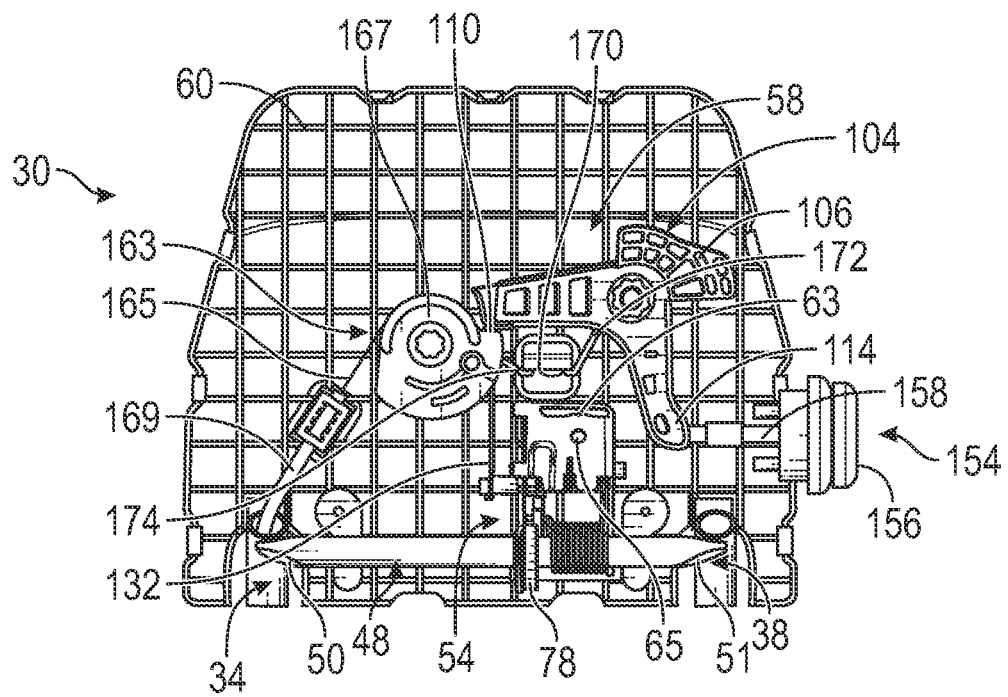
FIG. 12 depicts the headrest shell of FIG. 3 including first actuator member and second actuator member, in accordance with a non-limiting example.
Figure 13:
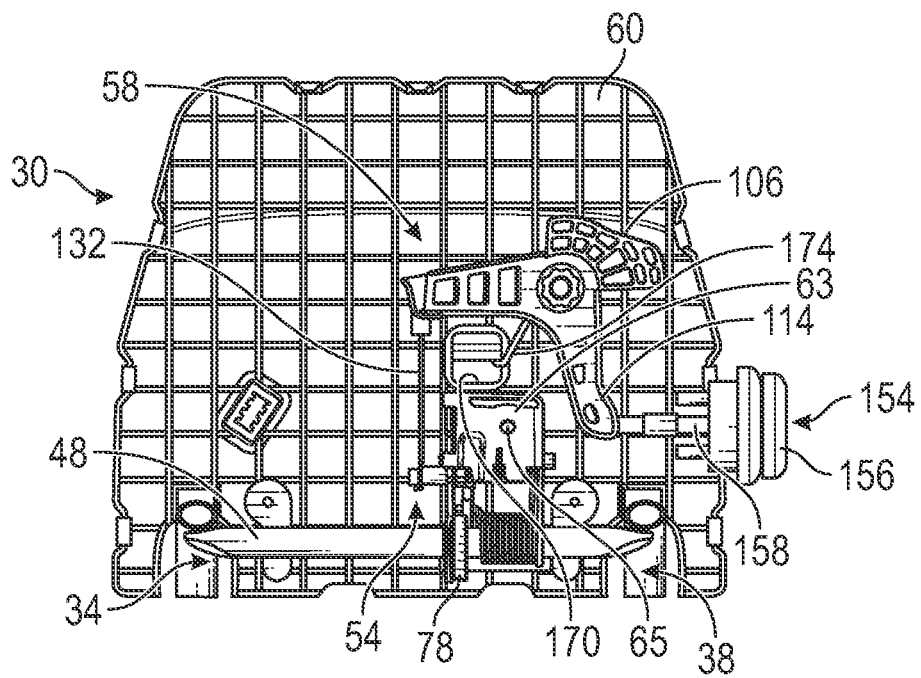
FIG. 13 depicts the headrest shell of FIG. 3 with only the first actuator member, in accordance with a non-limiting example.
Figure 14:
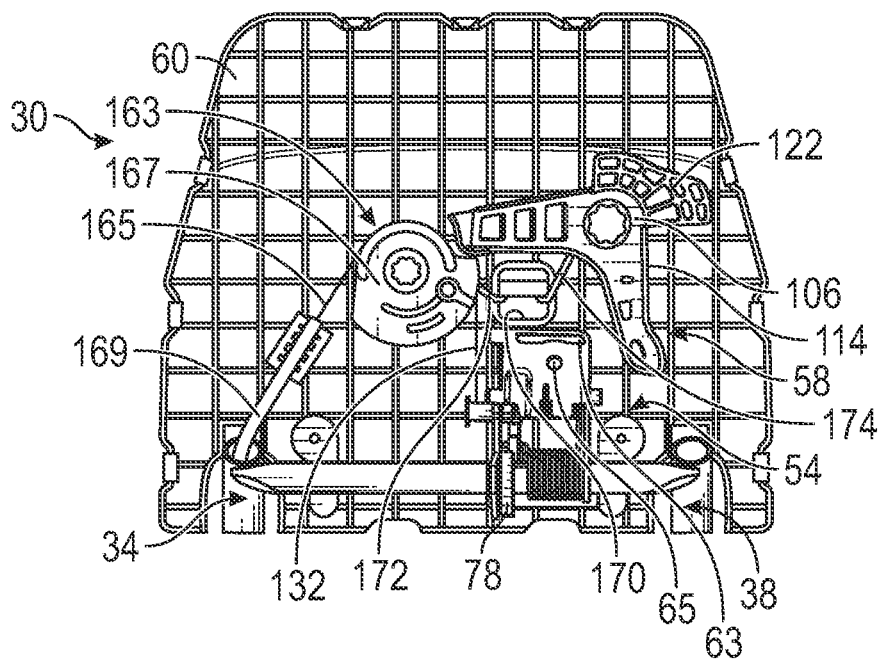
FIG. 14 depicts the headrest of FIG. 3 with only the second actuator member, in accordance with a non-limiting example.

In accordance with a non-limiting example depicted in FIGS. 12-14, and with continued reference to FIGS. 4-9, multi-actuator capable headrest 30 may accommodate one, another, or two different actuator systems. In FIG. 12, multi-actuator capable headrest 30 includes a first actuator system 154 that is shown in the form of a button 156. An actuator element 158 extends between button 156 and second actuator portion 114 of actuator mechanism 58. With this arrangement, a first input to button 156 causes actuator 104 to rotate about mount 118 such that connecting rod 132 raises and rotates first cam member 84. First cam portion 90 disengages from first cam surface 80, FIG. 6, as first cam member 84 rotates. Projection portion 102, FIG. 7, engages projection 101 imparting a rotational force to second cam member 86. Second cam portion 92 disengages from second cam surface 82 releasing biasing element 78 such that first spring member 96 provides a biasing force causing multi-actuator capable headrest 30 to rotate about headrest support 48.

Multi-actuator capable headrest 30 is also shown to include a second actuator system 163 including a cable 165 that extends through first seatback support 34 to a pulley 167. A second input, such as tension imparted to cable 165, causes pulley 167 to rotate and engage first actuator portion 110 or actuator mechanism 58 causing actuator 104 to rotate about mount 118 activating multi-cam release mechanism 54 such that multi-actuator capable headrest 30 may rotate forward. Cable 165 may extend through a sleeve 169 across a portion of headrest shell 60. Cable 165 may include a manual pull (not shown) or be connected in such a way such that rotating foldable seatback 24 forward automatically releases multi-actuator capable headrest 30.

In a non-limiting example, headrest shell 60 may include an inspection window 170 that accommodates a visual check during manufacturing. That is, inspection window 170 allows inspectors to check that a first return spring 172 associate with bell crank 106 and a second return spring 174 associated with pulley 167 are installed. First return spring 172 biases bell crank 106 to a neutral position. Likewise, second return spring 174 biases pulley 167 to a neutral position.

In FIG. 13, multi-actuator capable headrest 30 is only provided with first actuator member 154. In FIG. 14, multi-actuator capable headrest 30 is only provided with second actuator system 163. The non-limiting examples provide various configurations that may be tailored to specific vehicle models and trim packages. Further, the non-limiting examples provide for cost effective high volume production with only minor modifications to transition between different models as shown in FIGS. 15-24.

Figure 5:
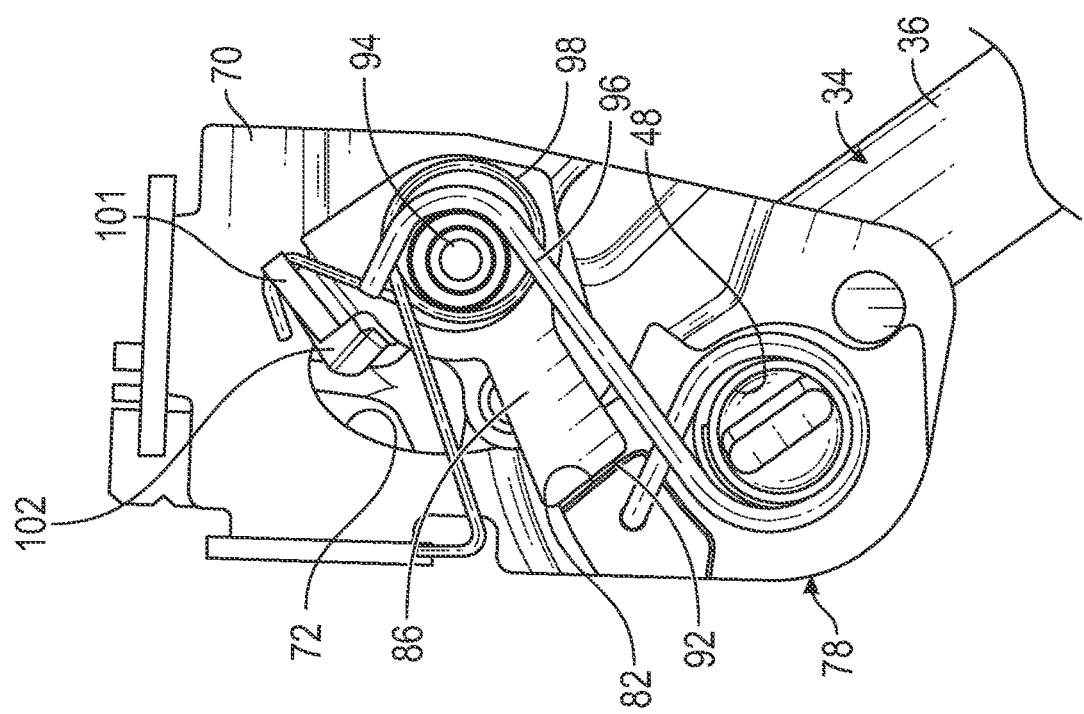
FIG. 5 depicts a side view of the multi-cam release mechanism of FIG. 3, in accordance with a non-limiting example.
Figure 8:
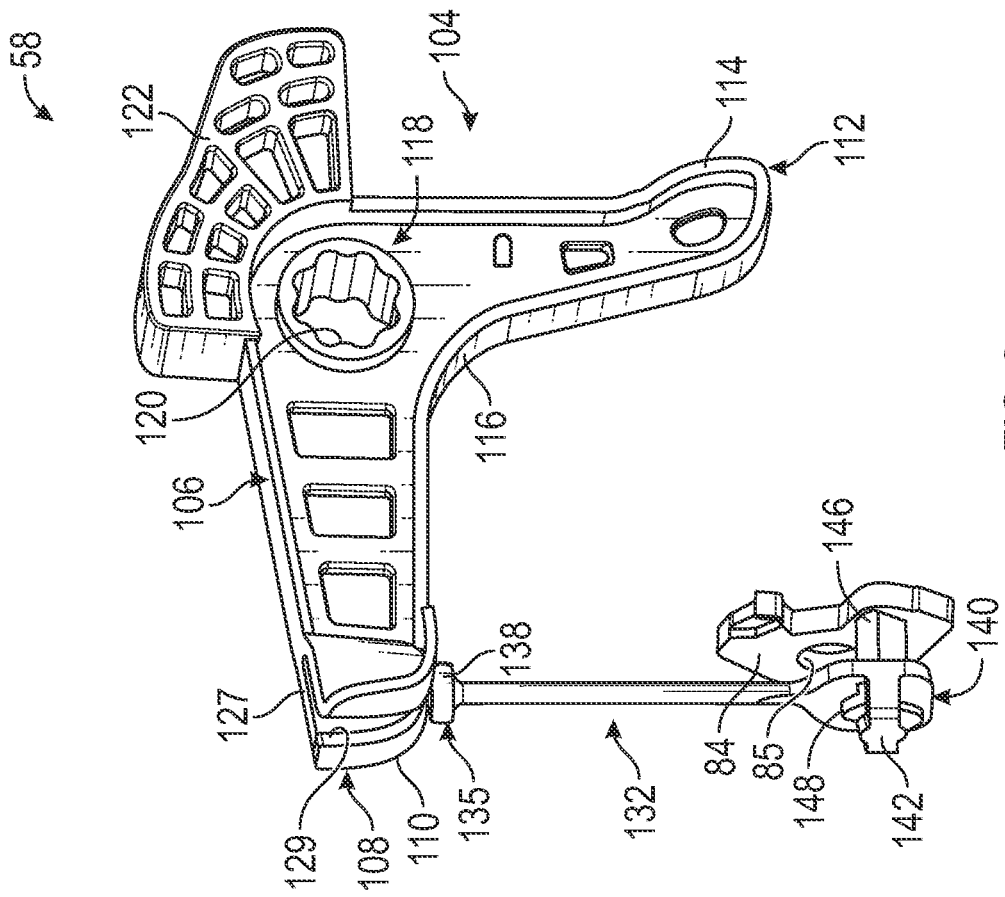
FIG. 8 depicts the actuator of FIG. 3 connected to the first cam member by a connecting rod, in accordance with a non-limiting example.
Figure 7:
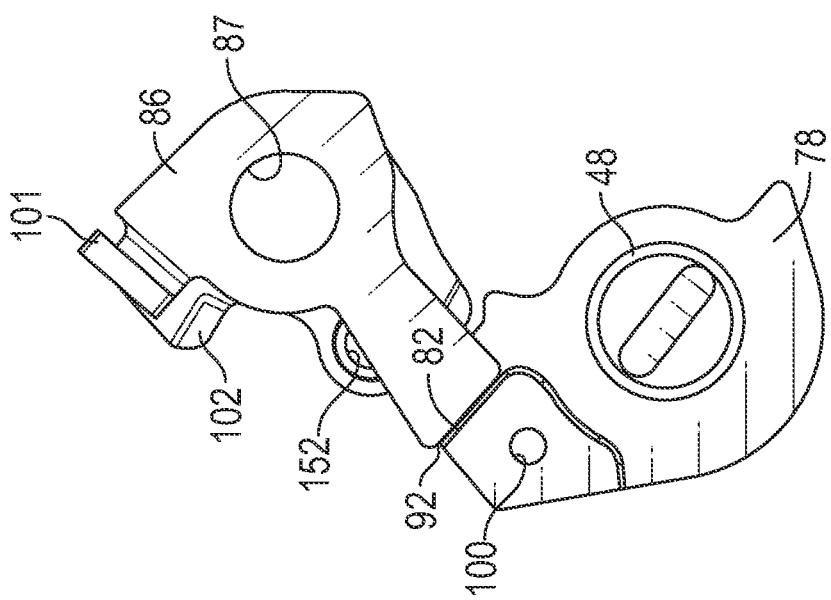
FIG. 7 is a side view of the second cam member interacting with the biasing element, in accordance with a non-limiting example.
Figure 15:
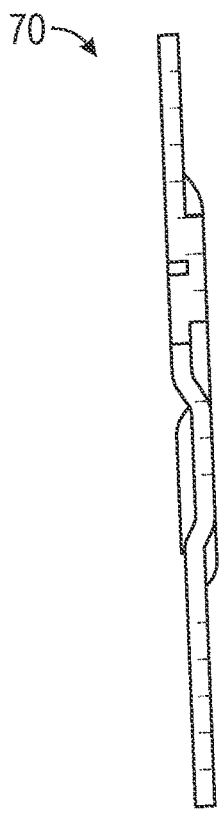
FIG. 15 depicts a first step in manufacturing the multi-actuator capable headrest, in accordance with a non-limiting example.
Figure 16:
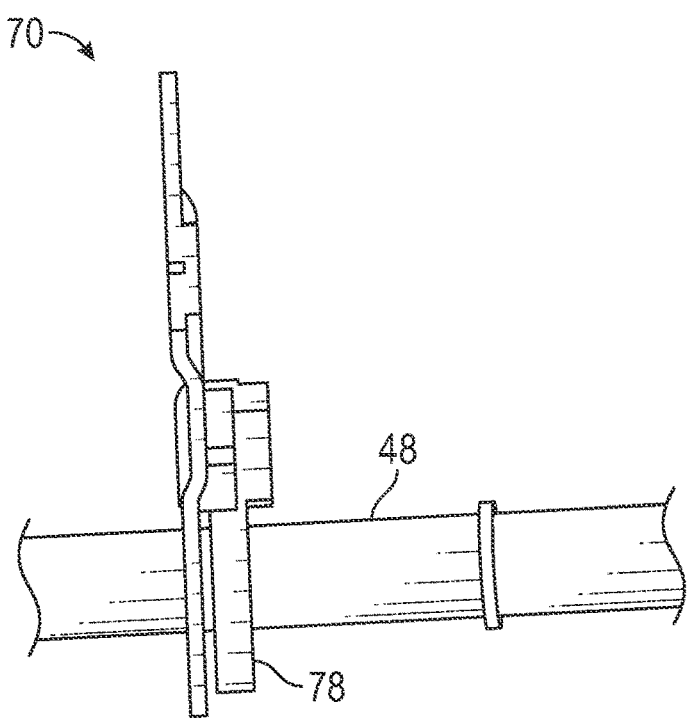
FIG. 16 depicts a second step in manufacturing the multi-actuator capable headrest, in accordance with a non-limiting example.
Figure 17:
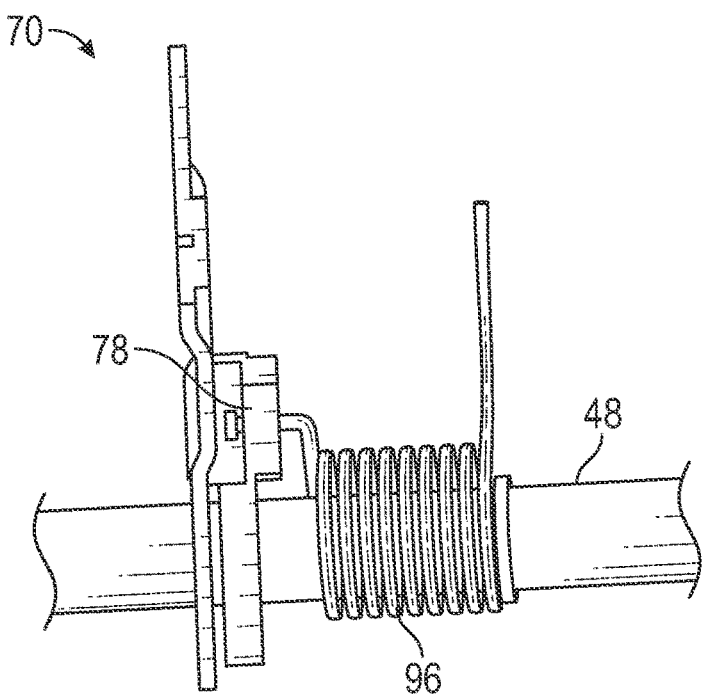
FIG. 17 depicts a third step in manufacturing the multi-actuator capable headrest, in accordance with a non-limiting example.
Figure 18:
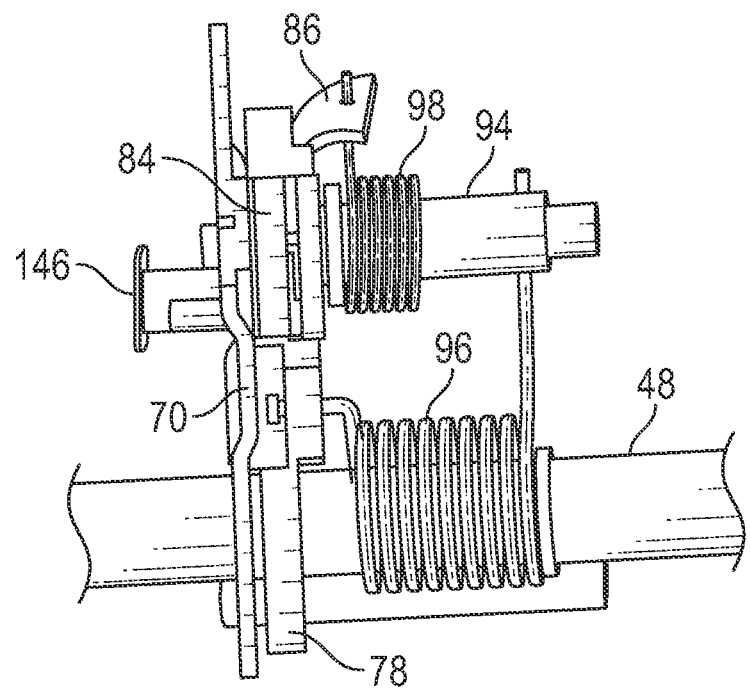
FIG. 18 depicts a fourth step in manufacturing the multi-actuator capable headrest, in accordance with a non-limiting example.
Figure 19:
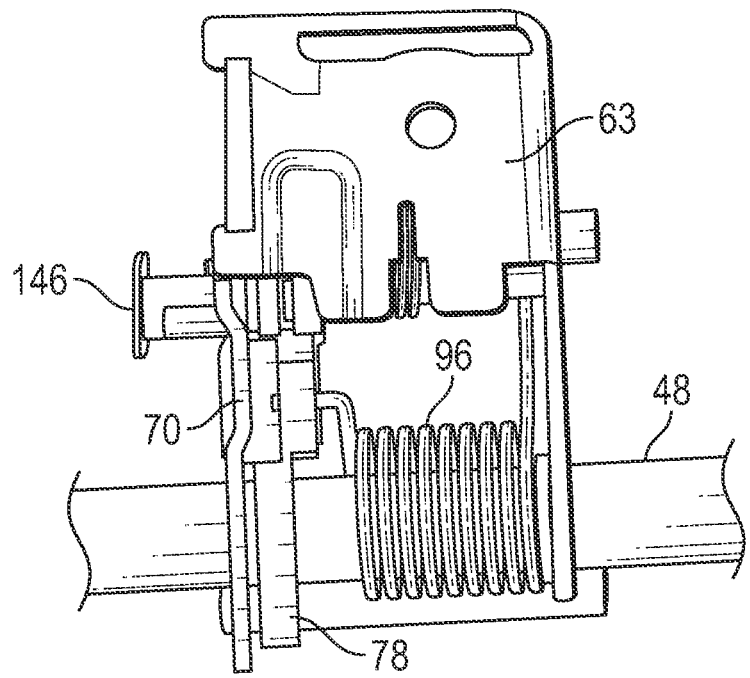
FIG. 19 depicts a fifth step in manufacturing the multi-actuator capable headrest, in accordance with a non-limiting example.
Figure 20:
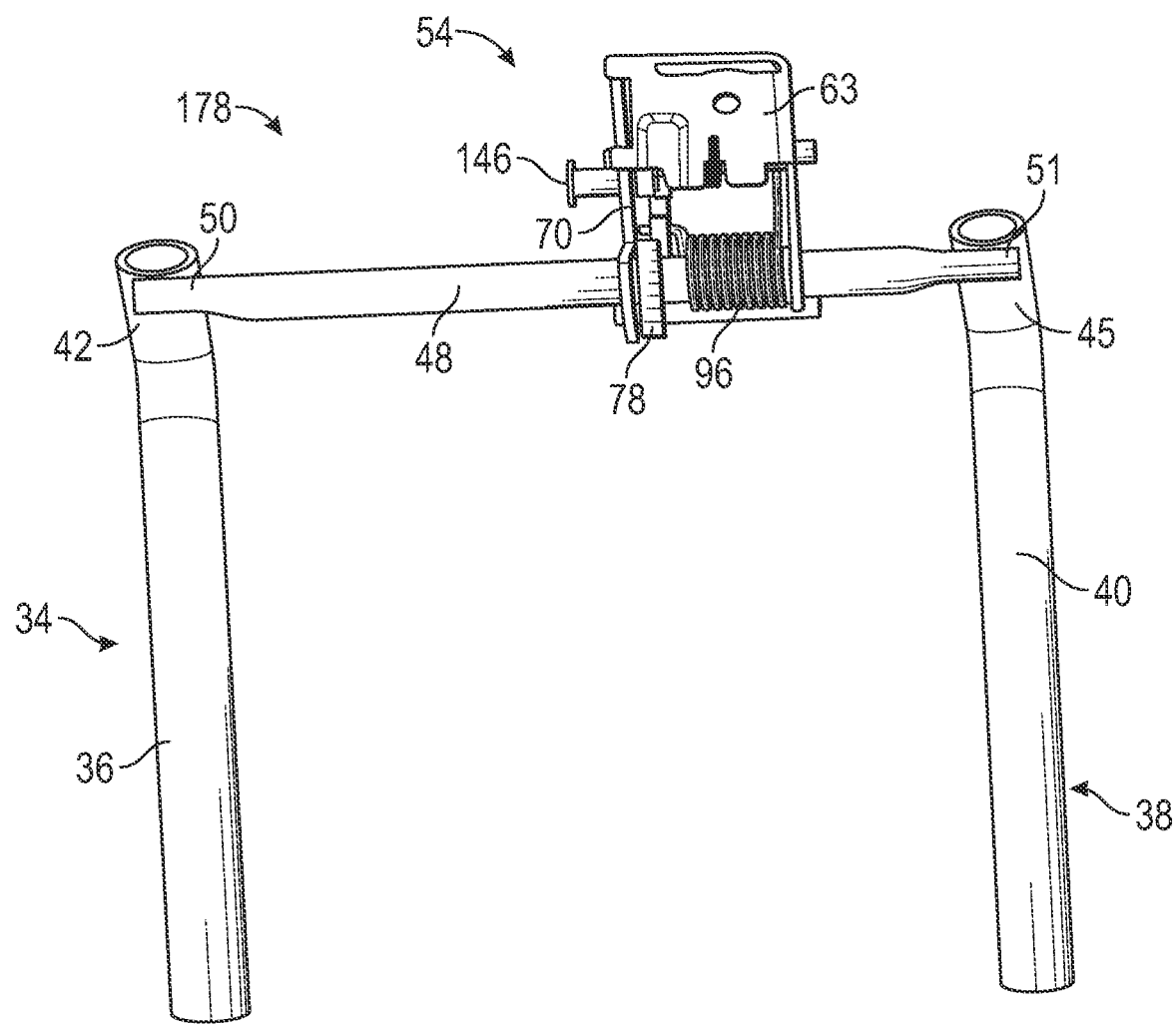
FIG. 20 depicts a sixth step in manufacturing the multi-actuator capable headrest, in accordance with a non-limiting example.

In FIG. 15, connector element 70, FIG. 5, is prepared and fixedly connected to headrest support 48 with biasing element 78 as shown in FIG. 16. In FIG. 17 first spring member 96 is installed and, in FIG. 18, first cam member 84, second cam member 86 and support pin 94 along with second spring member 98 are installed. In FIG. 19, housing 63 is mounted and a headrest subassembly 178 is formed by connecting headrest support 48 to first seatback support 34 and second seatback support 38 as shown in FIG. 20.

Figure 21:
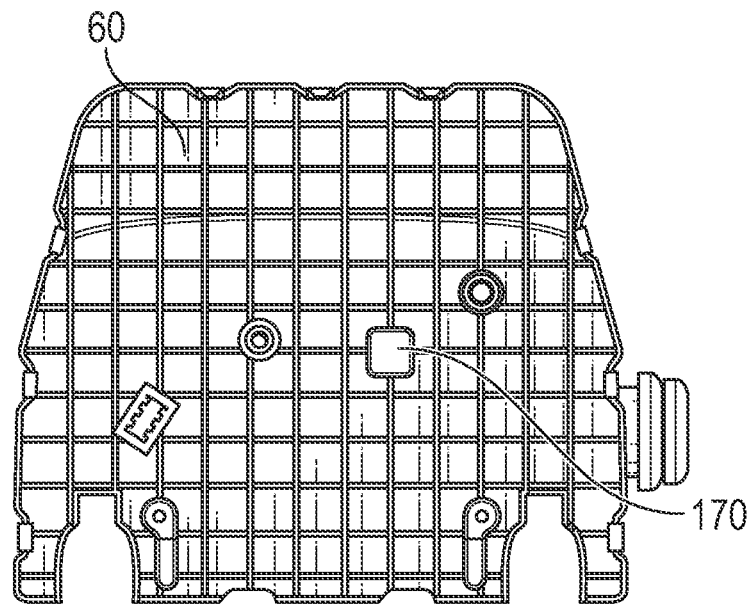
FIG. 21 depicts a seventh step in manufacturing the multi-actuator capable headrest, in accordance with a non-limiting example.
Figure 22:
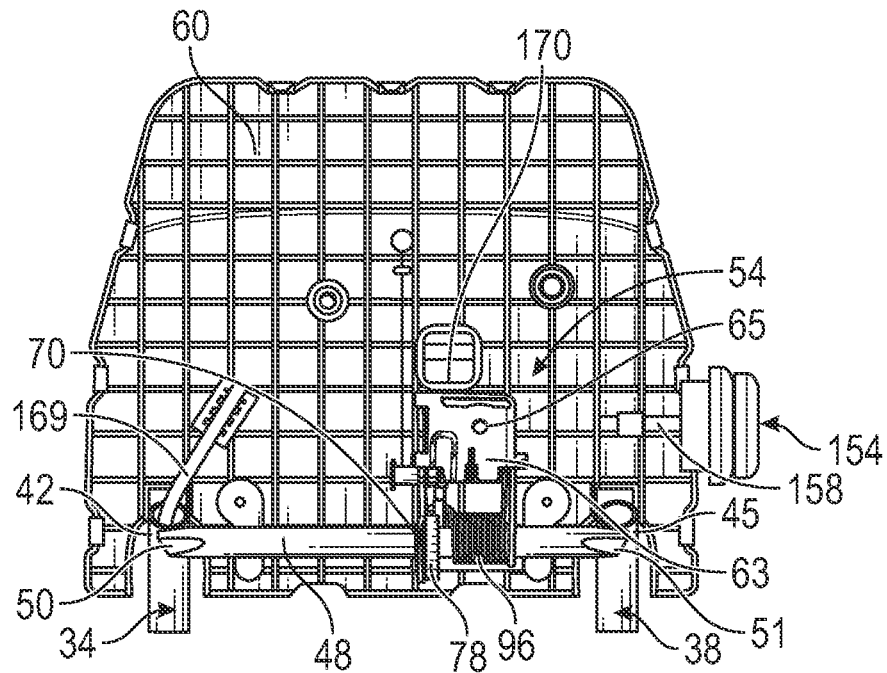
FIG. 22 depicts an eighth step in manufacturing the multi-actuator capable headrest, in accordance with a non-limiting example.
Figure 23:
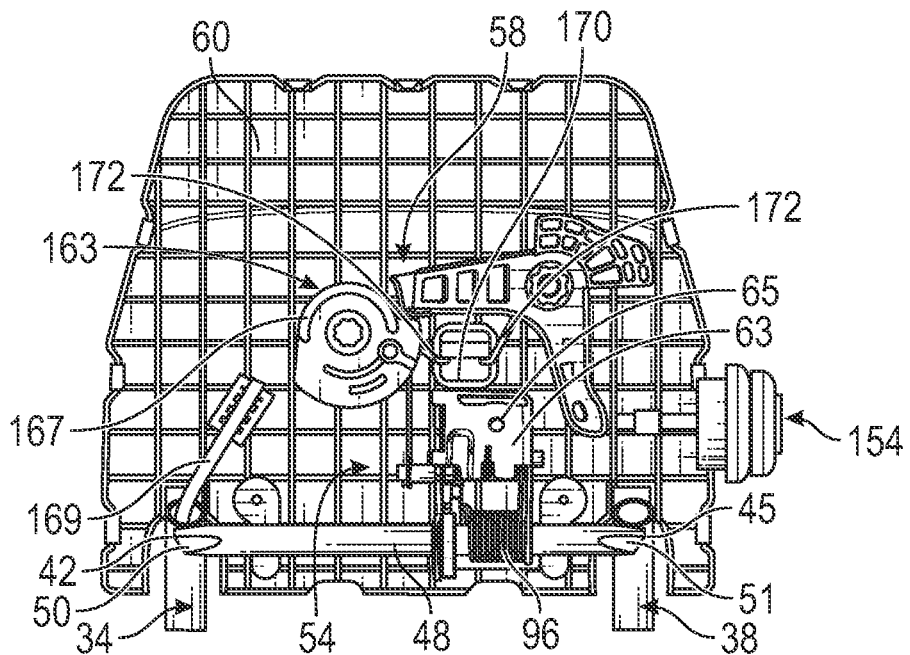
FIG. 23 depicts a ninth step in manufacturing the multi-actuator capable headrest, in accordance with a non-limiting example.
Figure 24:
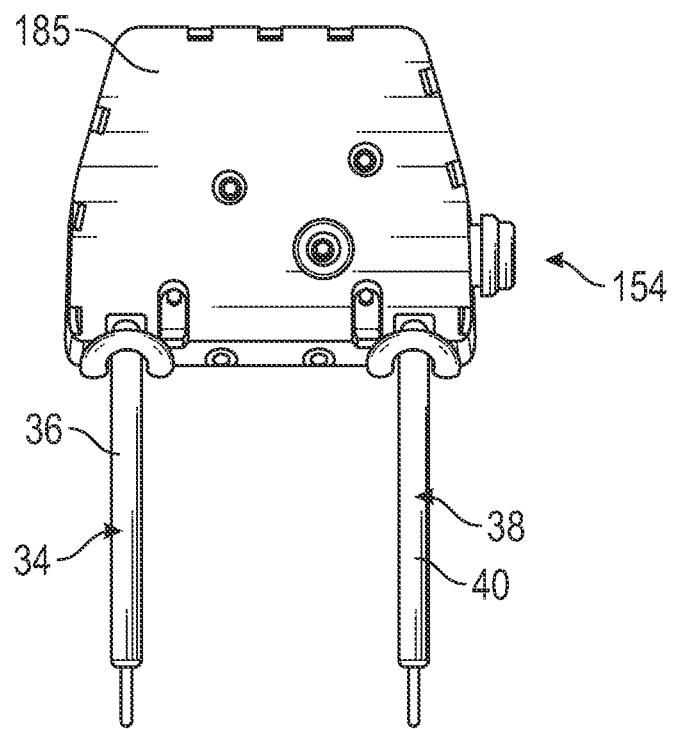
FIG. 24 depicts a tenth step in manufacturing the multi-actuator capable headrest, in accordance with a non-limiting example.
Figure 25:
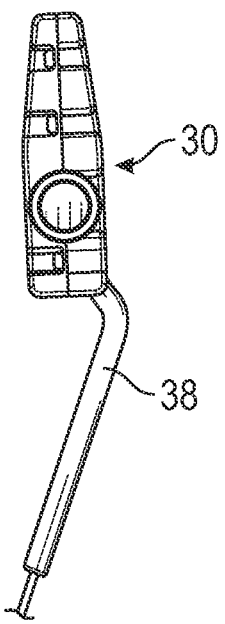
FIG. 25 depicts a side view of a multi-actuator capable headrest, in accordance with a non-limiting example.
Figure 26:
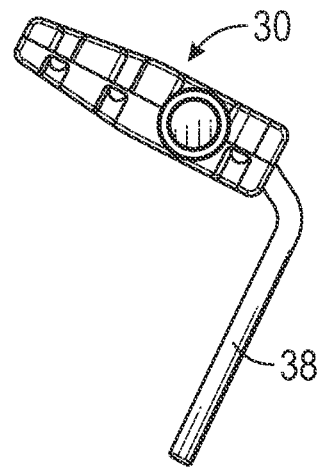
FIG. 26 depicts the a multi-actuator capable headrest of FIG. 25 configured for a first fold angle, in accordance with a non-limiting example.
Figure 27:
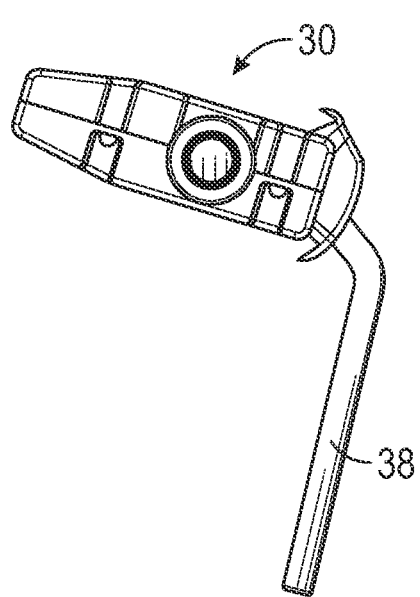
FIG. 27 depicts the a multi-actuator capable headrest of FIG. 25 configured for a second fold angle, in accordance with a non-limiting example.
Figure 28:
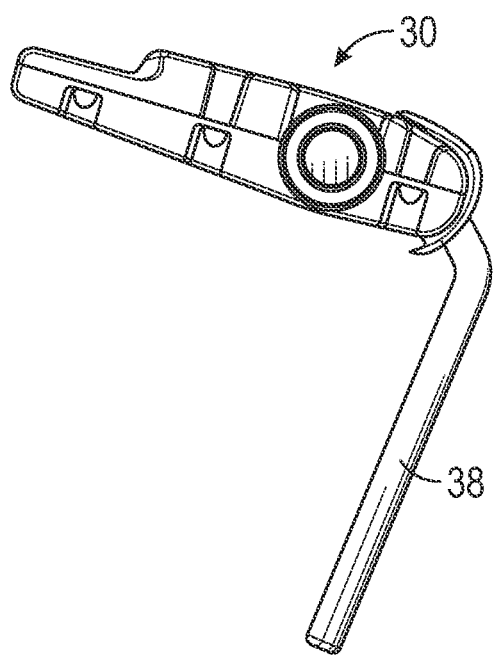
FIG. 28 depicts the a multi-actuator capable headrest of FIG. 25 configured for a third fold angle, in accordance with a non-limiting example.

In FIG. 21, headrest shell 60 is prepared and in FIG. 22, headrest subassembly 178 is mounted by engaging single mechanical fastener 65 (FIG. 3) through housing 63. At this point, actuator mechanism may be mounted to headrest shell 60. FIG. 23 depicts the incorporation of first actuator member 154 and second actuator system 163. In FIG. 24, a second headrest shell 185 is connected to headrest shell 60. A covering may be applied and multi-actuator capable headrest 30 installed in vehicle 10. It should be understood that headrest shell 60 and second headrest shell 185 may have various widths and heights so as to be configured for different vehicle models and trim packages. It should be understood that the non-limiting examples describe a multi-actuator capable headrest that is easily manufactured and adaptable to various configuration including one, another, or two actuator modes. Further, the multi-actuator capable head rest may be readily configured for different fold angles. That is, multi-actuator capable headrest may transition from a non-deployed configuration such as shown in FIG. 25, to a folded configuration having a selected fold angle. That is, by changing the connecting rod, multi-actuator headrest 30 may be configured for a 67° fold angle such as shown in FIG. 26; a 72° fold angle such as shown in FIG. 27; or a 90° fold angle such as shown in FIG. 28.

Reference will now follow to FIGS. 29-32 in describing second actuator system 163 in accordance with another non-limiting example. Second actuator system 163 is designed to be non-binding when multi-actuator capable headrest 30 transitions between the upright FIG. 29) and folded configurations (FIG. 30). In a non-limiting example, sleeve 169 includes a first end 208, a second end 210, and an intermediate portion 212 that extends between first end 208 and second end 210. Intermediate portion 212 defies a longitudinal length of sleeve 169. In a non-limiting example, cable 165 includes a first end section 220 that extends through and projects outwardly of first end 208 of sleeve 169 and a second end section 222 that extends through and projects outwardly of second end 210 of sleeve 169. Sleeve 169 also includes a first mounting ferrule 230 secured to first end 208 and a second mounting ferrule 234 attached at second end 210. First mounting ferrule secures sleeve 169 within foldable seatback 24 while second mounting ferrule 234 secures sleeve 169 within multi-actuator capable headrest 30.

In a non-limiting example, sleeve 169 includes a split 260 positioned along intermediate portion 212. Split 260 allows second end 210 of sleeve 169 to move relative to first end 208 resulting in a change to the longitudinal length, (e.g., a change in length between first end 208 and second end 210). That is, as multi-actuator capable headrest 30 transitions from the upright configuration (FIG. 29) to the folded configuration (FIG. 30), second end 210 may slide over cable 165 causing an increase in the longitudinal length. The increase in longitudinal length prevents binding of sleeve 169 allowing multi-actuator capable headrest 30 to transition freely between the upright configuration and the folded configuration.

Figure 31:
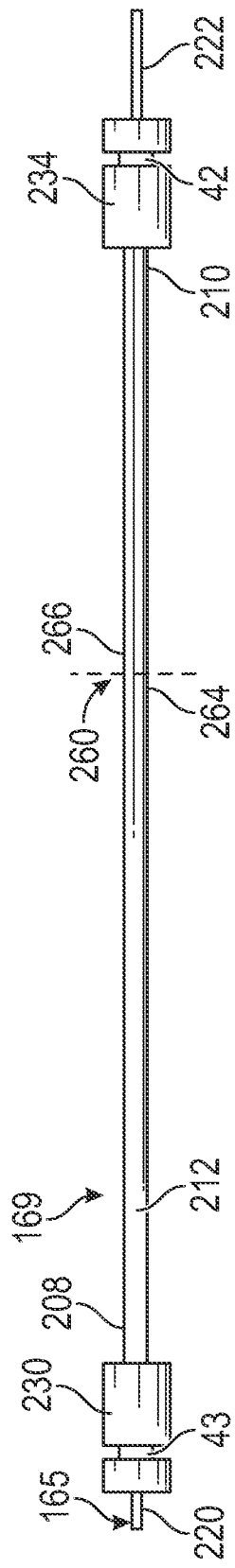
FIG. 31 depicts a cable and sleeve of the second actuator system, in accordance with a non-limiting example.

In a non-limiting example, split 260 is defined by a first end portion 264 and a second end portion 266 that face one another. More specifically, sleeve 169 includes a first section (not separately labeled) that extends from first end 208 to first end portion 264 and a second section (also not separately labeled) that extends from second end 210 to second end portion 266. In a non-limiting example shown in FIGS. 31 and 32, first end portion 264 includes a first end surface 270 and second end portion 266 includes a second end surface 272. In a non-limiting example, first end surface 270 abuts second end surface 272 when multi-actuator capable headrest 30 is in the upright configuration as shown in FIGS. 29 and 31.

Figure 32:
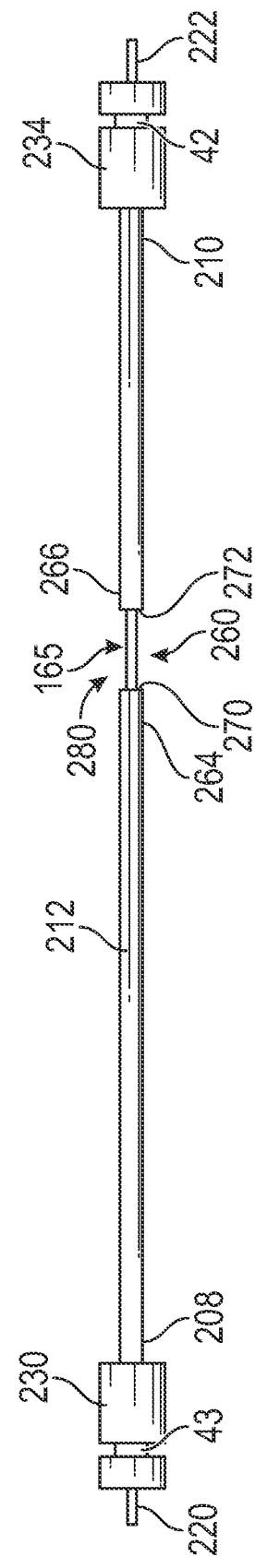
FIG. 32 depicts the sleeve of FIG. 31 in an extended configuration, in accordance with a non-limiting example.

In another non-limiting example, second surface 272 is spaced from first surface 270 forming a discontinuity 280 in sleeve 169 when multi-actuator capable headrest 30 is in the folded configuration (FIGS. 30 and 32). That is, as the longitudinal length of sleeve 169 increases with the folding of multi-actuator capable headrest 30 discontinuity 280 forms. The particular length of discontinuity 280 may vary. At this point, it should be understood that the longitudinal length of sleeve 169 may be increased through other arrangements in order to avoid binding. For example, first end portion 264 could be received by second end portion 266 such that second end 210 telescopes relative to first end 208 when multi-actuator capable headrest 30 transitions to the folded configuration.

In a non-limiting example, foldable seatback 24 may be released and folded forward. As foldable seatback 24 rotates forward, tension is created in cable 165 activating multi-cam release mechanism 54. At this point, multi-actuator capable headrest 30 rotates or pivots forward causing second end 210 of sleeve 169 to slide over cable 165. The longitudinal length of sleeve 169 increases creating discontinuity 280 at split 260. As foldable seatback 24 is rotated upwardly, tension is released in cable 165 allowing sleeve to shorten as multi-actuator capable headrest 30 returns to the upright position as discussed herein. Thus, the non-limiting examples present a system that allows a protective sleeve to lengthen as tension is built in a cable to accommodate folding movement of a head rest. Further, while described as being employed in combination with a multi-actuator capable head rest, it should be understood that the sleeve may be employed in a wide range of applications that would benefit from reduced binding.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A vehicle seat comprising:
   a seatback;
   a first seatback support mounted to the seatback;
   a second seatback support mounted to the seatback, the second seatback support being spaced from the first seatback support;
   a headrest including a shell member coupled to the first seatback support and the second seatback support;
   a release mechanism mounted to the shell member, the release mechanism selectively locking the headrest relative to the seatback; and
   an actuator system extending between the seatback and the headrest through one of the first and second seatback supports, the actuator system including a sleeve having a first end fixedly connected relative to the seatback, a second end fixedly connected relative to the headrest shell, and an intermediate portion defining a longitudinal length of the sleeve and a cable extending through the sleeve, the cable having a first end section arranged in the seatback and a second end section coupled to the release mechanism, wherein the longitudinal length of the sleeve includes a first dimension when the seatback is in an upright position and the longitudinal length has a second, longer dimension, when the seatback is in a folded configuration, wherein the sleeve includes a split arranged along the intermediate portion, the split extending radially through the sleeve between the first end and the second end.

2. The vehicle seat according to claim 1, wherein the sleeve includes a first mounting ferrule secured to the first end and a second mounting ferrule secured to the second end, the second mounting ferrule being fixedly secured to the shell member of the headrest.

3. The vehicle seat according to claim 1, wherein the second end of the sleeve is slidable relative to the cable.

4. The vehicle seat according to claim 1, wherein the split includes a first end portion of the sleeve and a second end portion of the sleeve, the first end portion having a first surface and the second end portion having a second surface.

5. The vehicle seat according to claim 4, wherein the second surface is spaced from the first surface forming a discontinuity in the sleeve when the seatback is in a folded configuration.

6. The vehicle seat according to claim 5, wherein the second surface abuts the first surface when the seatback is an upright configuration.

7. A vehicle comprising:
   a body including a passenger compartment;
   a seat arranged in the passenger compartment, the seat including:
      a selectively foldable seatback;
      a first seatback support mounted to the seatback;
      a second seatback support mounted to the seatback, the second seatback support being spaced from the first seatback support;
      a headrest including a shell member coupled to the first seatback support and the second seatback support;
      a release mechanism mounted to the shell member, the release mechanism selectively locking the headrest relative to the seatback; and
      an actuator system extending between the seatback and the headrest through one of the first and second seatback supports, the actuator system including a sleeve having a first end fixedly connected relative to the seatback, a second end fixedly connected relative to the headrest shell, and an intermediate portion defining a longitudinal length of the sleeve and a cable extending through the sleeve, the cable having a first end section arranged in the seatback and a second end section coupled to the release mechanism, wherein the longitudinal length of the sleeve includes a first dimension when the seatback is in an upright position and the longitudinal length has a second, longer dimension, when the seatback is in a folded configuration, wherein the sleeve includes a split arranged along the intermediate portion, the split extending radially through the sleeve between the first end and the second end.

8. The vehicle according to claim 7, wherein the sleeve includes a first mounting ferrule secured to the first end and a second mounting ferrule secured to the second end, the second mounting ferrule being fixedly secured to the shell member of the headrest.

9. The vehicle according to claim 7, wherein the second end of the sleeve is slidable relative to the cable.

10. The vehicle according to claim 7, wherein the split includes a first end portion of the sleeve and a second end portion of the sleeve, the first end portion having a first surface and the second end portion having a second surface.

11. The vehicle according to claim 10, wherein the second surface is spaced from the first surface forming a discontinuity in the sleeve when the seatback is in a folded configuration.

12. The vehicle according to claim 11, wherein the second surface abuts the first surface when the seatback is in an upright configuration.

13. A method of folding a headrest in a vehicle comprising:
   folding a seatback forward;

creating tension in a cable protected in a sleeve passing through the seatback into the headrest, the sleeve having a first end anchored in the seatback and a second end anchored in the headrest;

activating a release mechanism allowing the headrest to pivot with the tension in the cable;

rotating the headrest relative to the seatback; and lengthening the sleeve by shifting the second end of the sleeve relative to the first end of the sleeve as the headrest rotates to avoid binding.

14. The method of claim 13, wherein shifting the second end of the sleeve relative to the first end of the sleeve includes sliding the second end of the sleeve over the cable.

15. The method of claim 14, wherein lengthening the sleeve includes sliding the second end of the sleeve over the cable without moving the first end of the sleeve.

16. The method of claim 15, wherein the sleeve includes a split defined between the first end and the second end, the split including a first surface and a second surface, wherein lengthening the sleeve includes shifting the first surface relative to the second surface.

17. The method of claim 16, wherein lengthening the sleeve includes creating a discontinuity in the sleeve between the first surface and the second surface.

* * * * *